March 27, 1956 — S. W. LYSZCZEK — 2,739,747
GLASS RACK
Filed Nov. 21, 1952 — 2 Sheets-Sheet 1
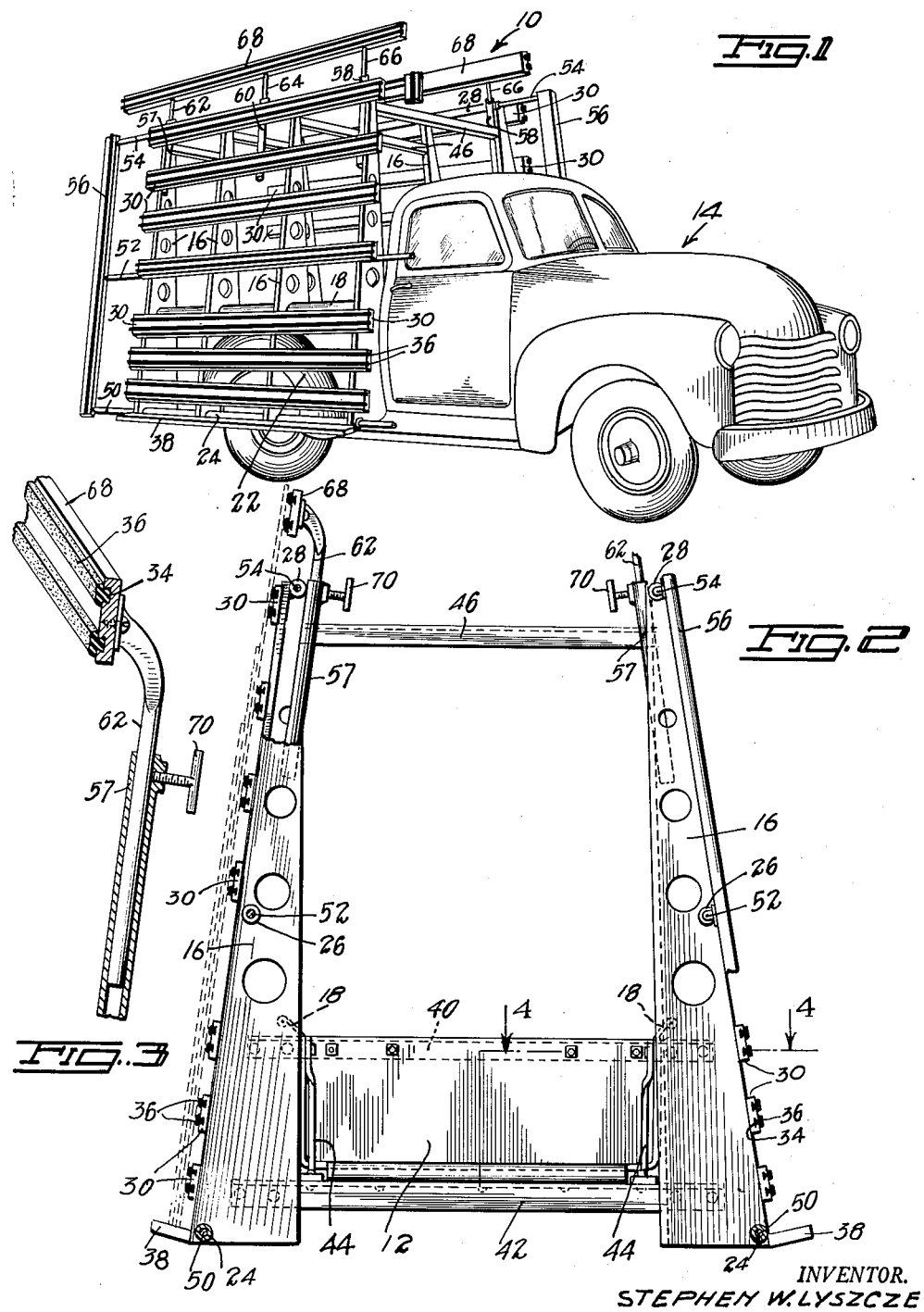
INVENTOR.
STEPHEN W. LYSZCZEK
BY Lyon & Lyon
ATTORNEYS March 27, 1956 S. W. LYSZCZEK 2,739,747
GLASS RACK
Filed Nov. 21, 1952 2 Sheets-Sheet 2
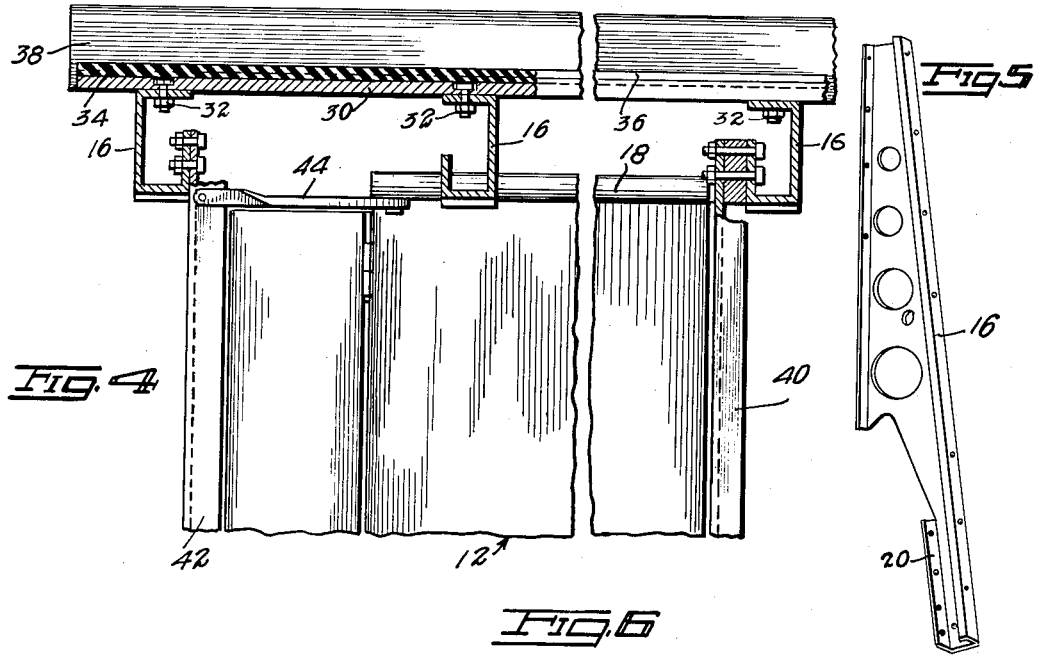
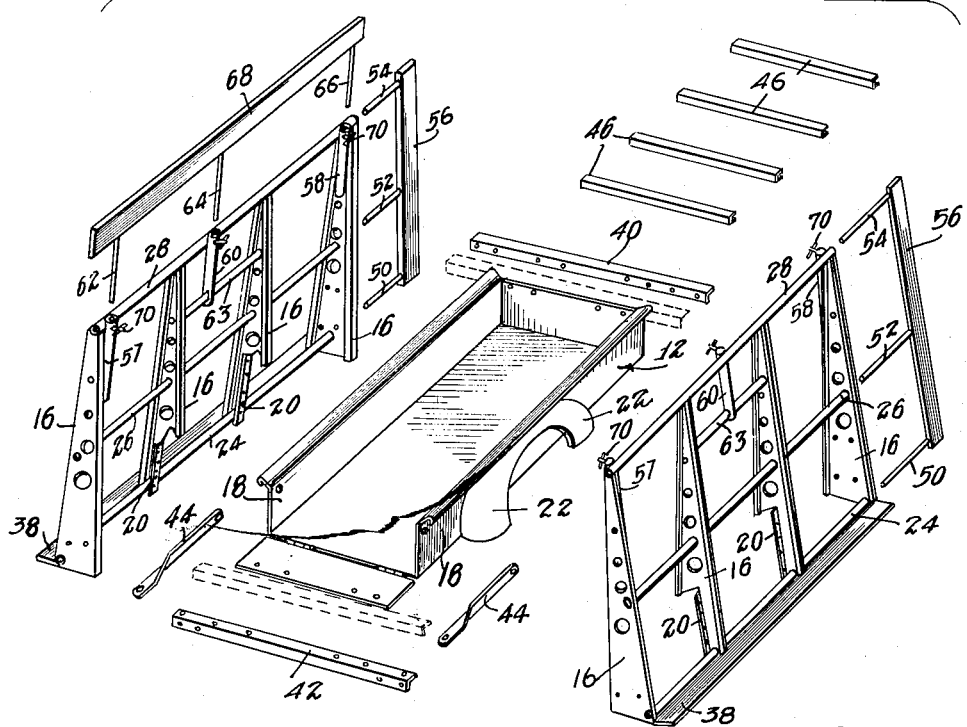
INVENTOR.
STEPHEN W. LYSZCZEK
BY Lyon & Lyon
ATTORNEYS

United States Patent Office 2,739,747
Patented Mar. 27, 1956

2,739,747

GLASS RACK

Stephen W. Lyszczek, North Hollywood, Calif.

Application November 21, 1952, Serial No. 321,814

2 Claims. (Cl. 224—42.11)

This invention relates to a glass rack.

An object of this invention is to provide a rack adapted to be mounted on a truck bed to carry panes of glass.

A further object of this invention is to provide a glass rack which can be adjusted in size to accommodate the size of panes carried.

Still a further object of this invention is to provide means on said glass rack avoiding scratching and other injury to glass panes supported on said rack.

Other objects and advantages of this invention will be readily apparent from the following description.

In the drawings:

Figure 1 is a perspective view of a truck carrying a glass rack embodying this invention.

Figure 2 is a rear elevation with some parts broken away.

Figure 3 is a vertical section through the extension bar for the vertical extension of the rack.

Figure 4 is a section taken along line 4—4 of Figure 2.

Figure 5 is a perspective view of one of the struts.

Figure 6 is an exploded view of the component elements.

A rack 10 embodying this invention is easily modified to be mounted upon the bed 12 of a truck 14. A plurality of struts 16 are formed with their lower extremities adapted to fit onto the side walls 18 of the bed 12. The inner struts have flanges 20 formed thereon by which they are bolted either to the side wells 18 or the fenders 22 of the truck. Spacing pipes 24 and 26 pass through suitable apertures in the struts and are welded thereto. A third spacing pipe 28 is welded to the tops of the struts.

Slats 30 are spaced from one another vertically and bolted as at 32 to the struts 16. Each slat is provided with a pair of spaced dovetailed grooves along its length. Into each groove a dovetailed strip of rubber 34 having an enlarged outer surface 36 is inserted so that the outer surface 36 projects a substantial distance above the surface of the slats. Thus glass carried upon the rack is supported by the rubber strips 34 avoiding scratching and injury. A base platform 38 is welded on each side of the rack to the struts 16 to provide a support for the glass panes during transportation.

A front brace for the rack is provided by angle iron 40 which is bolted to the bed 12 and to the leading struts 16. A rear brace is provided by angle iron 42 which is suspended by links 44 from the side walls 18 and bolted to the rear struts 16. Cross braces 46 are welded to the tops of opposed struts 16 to strengthen the structure.

The pipes 24, 26 and 28 are hollow to receive telescopically at either end of the rack studs 50, 52 and 54 which are attached to and carry the lateral extension bar 56. Thus the width of the glass rack can be adjusted to accommodate larger panes of glass.

Secured to the rear and forward struts 16 are pipes 57 and 58 and a third pipe 60 is supported by cross braces 63. The pipes 57, 58 and 60 telescopically receive studs 62, 64 and 66 respectively which carry a cross slat 68 similar to slats 30. A setscrew 70 is provided in each pipe 57, 58 and 60 which, when tightened, holds the slat 68 in the desired position and, when loosened, permits vertical adjustment of the slat 68. Thus glass panes of varying heights can be accommodated by the rack.

While what hereinbefore has been described is the preferred embodiment of this invention, it is readily apparent that alterations and modifications can be resorted to without departing from the scope of this invention and the following claims.

I claim:

1. In a device for carrying glass panes of the type adapted to be mounted upon the well of a truck, the combination of: a plurality of struts lining each side of said well, at least two pipes securing each line of struts, cross braces spacing the upper extremities of said struts, a plurality of spaced slats mounted on each line of struts forming a pair of glass supporting racks, a vertically extending slat having studs thereon fitting into said pipes so that said vertically extending slat is adjustable with respect to said racks to accommodate a larger pane of glass.

2. In a device for carrying glass panes of the class adapted to be mounted upon the well of a truck, the combination of: a plurality of struts lining each side of said well, a plurality of spaced slats mounted on each opposed line of struts forming a glass rack on each side of said well, cross braces spacing the upper extremities of said glass racks from one another, a cross brace secured to said well and to the leading strut of each glass rack, a cross brace secured to said well and to the trailing strut in each glass rack, at least two vertically projecting hollow pipes mounted upon one line of struts, a horizontally extending slat having studs thereon fitting into said vertically extending hollow pipes, and means for controlling vertical adjustment of said horizontally extending slat.

References Cited in the file of this patent

UNITED STATES PATENTS

| | | |
|---|---|---|
| 1,879,513 | Rothholz | Sept. 27, 1932 |
| 2,100,971 | McDonald | Nov. 30, 1937 |
| 2,125,783 | Heeman | Aug. 2, 1938 |
| 2,518,624 | Kraft | Aug. 15, 1950 |
| 2,570,802 | Hatteburg | Oct. 9, 1951 |